(12) United States Patent
Stevens et al.

(10) Patent No.: US 7,457,488 B2
(45) Date of Patent: Nov. 25, 2008

(54) LIGHT TRANSMISSION WITH TEMPERATURE SENSITIVE MATERIALS

(75) Inventors: Rick C. Stevens, Apple Valley, MN (US); Allison Hernandez, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 121 days.

(21) Appl. No.: 11/173,687

(22) Filed: Jun. 30, 2005

(65) Prior Publication Data
US 2007/0003181 A1 Jan. 4, 2007

(51) Int. Cl.
*G02F 1/295* (2006.01)
(52) U.S. Cl. .................. 385/4; 385/5; 385/55; 385/141; 385/144
(58) Field of Classification Search .............. 385/4, 385/5, 55, 53, 141, 144
See application file for complete search history.

(56) References Cited

U.S. PATENT DOCUMENTS

| | | | |
|---|---|---|---|
| 3,981,592 A | | 9/1976 | Williams |
| 4,070,118 A | | 1/1978 | Maslowski et al. |
| 6,697,548 B2 * | | 2/2004 | LoCascio et al. .............. 385/16 |
| 7,142,758 B1 * | | 11/2006 | Herz et al. ................... 385/125 |
| 7,186,032 B1 * | | 3/2007 | Stevens et al. ................ 385/53 |
| 7,226,214 B2 * | | 6/2007 | Holmquist .................... 385/75 |
| 7,362,938 B1 * | | 4/2008 | Herz et al. ................... 385/123 |
| 2003/0063865 A1 * | | 4/2003 | Holmquist .................... 385/75 |
| 2004/0131097 A1 * | | 7/2004 | Deppe et al. .................. 372/45 |
| 2005/0111805 A1 * | | 5/2005 | Hertz et al. .................. 385/125 |
| 2008/0085086 A1 * | | 4/2008 | Herz et al. ................... 385/123 |

OTHER PUBLICATIONS

Barnoski, "Fiber waveguides: a novel technique for investigating attenuation characteristics," Appl. Opt., Sep. 1976, vol. 15, No. 9, 2112-2115.
Thrush, "Integrated Semiconductor Vertical-Cavity Surface-Emitting Lasers and PIN Photodetectors for Biomedical Fluorescence Sensing,"(2004),IEEE J.Quantum Electron,40,491-498.
Dragas, "Dual-Purpose VCSELs for Short-Haul Bidirectional Communication Links," IEEE Photon. Technol. Lett., Dec. 1999, vol. 11, No. 12 1548-1550.
Evident Technologies, "Optical Switching Applications using PbSe IR-Evidot Nanocrystals," Technical White Paper, Nov. 2002, available at www.evidenttech.com, 1-10.

* cited by examiner

*Primary Examiner*—James P Hughes
(74) *Attorney, Agent, or Firm*—Brooks, Cameron & Huebsch, PLLC

(57) ABSTRACT

One embodiment includes a connector for an optical pathway. The connector includes a body formed, at least in part, with a temperature sensitive material having one or more light transmission characteristics that change based upon the temperature of the material.

17 Claims, 3 Drawing Sheets

| WAVELENGTH | SIGNAL | | | | |
|---|---|---|---|---|---|
| | 260-0 | 260-1 | 260-2 | 260-3 | 260-Q |
| A | Y | Y | Y | Y | Y |
| B | Y | Y | Y | Y | Y |
| C | Y | Y | Y | N | N |
| D | Y | Y | Y | Y | Y |
| E | Y | Y | Y | Y | Y |

*Fig. 2D*

LIGHT TRANSMISSION WITH TEMPERATURE SENSITIVE MATERIALS

FIELD OF THE INVENTION

The present disclosure generally relates to temperature sensing. And, in particular, the present disclosure relates to temperature sensing in optical networks.

BACKGROUND

In an optical network, light waves are typically transmitted through an optical pathway. At one end of the optical pathway, a transmitter encodes a signal transmitted as light waves. These light waves are transmitted through the optical pathway to a receiver. The receiver receives the light waves and decodes the signal.

In an optical network, an optical pathway is typically constructed from a number of pathway sections. A pathway section is typically formed by fiber optic cable. The ends of adjacent sections are joined together by connectors, to form a single continuous optical pathway.

Optical pathways experience attenuation, which is a reduction in signal strength during the transmission of a signal. As light waves are transmitted through an optical pathway (e.g. optical fiber, splices, and connectors) the waves weaken, resulting in attenuation. This shortens the distance that a receiver can be positioned from a transmitter to receive an accurate signal.

Optical pathways also may experience a sensitivity to temperature. The temperature of an optical pathway's materials can adversely affect the transmission of light through the optical pathway by degrading the signal. For example, a temperature influence, such as heat can come from a number of sources, including the optical network and one or more of its components. Although this influence of temperature may degrade the signal in an optical pathway, it can be difficult to identify the temperature influencing source causing this degradation.

In identifying sources that influence the temperature in an optical pathway, temperature sensors can be placed at locations along the optical pathway. However, this method utilizes the purchase and installation of temperature sensors. This method can also involve extensive wiring to transmit the temperature information from each sensor to the operator of the optical network.

In another method of identifying temperature influencing sources, part or all of the optical network can be removed from the field and taken to a laboratory environment where it can be checked for temperature influencing sources. However, this method may require that the network be taken out of service, resulting in network downtime. Furthermore, this method is unable to detect temperature influencing sources specific to the field environment. The general temperature environment in the laboratory may be different from that of the field. Therefore, such methods may not be able to identify the existence of, or the significance of, a temperature influencing source.

SUMMARY

Embodiments of the present disclosure provide components, systems, and networks to sense temperature along an optical pathway of an optical network, while the pathway remains in its field environment.

In various embodiments of the present disclosure, a component contains a temperature sensitive material and can be used to join together optical pathway sections. For example, the component may be provided as a connector, such as a splice material, a connector body, or another type of structure between optical pathway sections.

The temperature sensitive material utilized in such components has light transmission characteristics that change based upon the temperature of the temperature sensitive material. At a first temperature, the temperature sensitive material transmits a number of wavelengths of light. At a second temperature, the temperature sensitive material absorbs one or more particular wavelengths of light that had been transmitted at the first temperature.

In some embodiments of the present disclosure, the temperature sensitive material can absorb one or more light wavelengths, or one or more ranges of light wavelengths, at a particular temperature. The temperature sensitive material can also absorb one or more light wavelengths, or one or more ranges of light wavelengths, at several different temperatures. Accordingly, in various embodiments, these temperature sensitive materials can transmit certain light wavelengths within a range of temperatures.

Such temperature sensitive materials can be manufactured so that a material transmits a number of known light wavelengths at a first known temperature but absorbs one or more of the known light wavelengths at a second known temperature. For example, in some embodiments, a temperature sensitive material can be manufactured to absorb one or more light wavelengths between 1300 and 1400 nanometers, among other ranges.

Accordingly, such temperature sensitive materials can be used as temperature sensors based upon the light transmission characteristics exhibited by the material. For example, by knowing the temperature sensitive material's temperature dependent light transmission characteristics, the temperature at the location of the temperature sensitive material can be ascertained.

Temperature sensitive materials allow one or more known light wavelengths to pass through at a particular temperature, but block the transmission of one or more of those light wavelengths at another temperature. This selective absorption can be observed by comparing the characteristics of a type of light signal having a number of known wavelengths to a light signal of the same type passed through the temperature sensitive material. If the temperature sensitive material allows a known light wavelength to pass through, then an observer can ascertain that the device is not at the absorption temperature. If the temperature sensitive material blocks the transmission of one or more of the known light wavelengths, then an observer can ascertain the temperature of the temperature sensitive material based upon its known characteristics of absorption at various particular temperatures.

In various embodiments of the present disclosure, an optical network or system can be used to sense temperature along one of its optical pathways while the pathway remains in its field environment. The optical pathway can have a number of pathway sections. An optical network can include an optical emitter positioned to emit a light wave through the optical pathway and a receiver positioned to receive the light wave via the optical pathway.

An optical network can further include a temperature sensitive material placed along the optical pathway such that light passes through the material. For example, the material can be a portion of a connector, positioned between a pair of pathway sections forming the optical pathway. As the light passes through the temperature sensitive material, one or more characteristics of a light wave passing through the material can change based upon temperature.

One type of temperature sensitive material is a semiconductor nanocrystal material. One form of semiconductor nanocrystal material is a quantum dot thin film. Quantum dot thin films can be made, for example, from crystals composed of periodic groups of II-VI, III-V, or IV-VI materials (also known as periodic groups 12-16, 13-15 or 14-16 under the current IUPAC system). Examples of quantum dot thin film materials include lead-selenide, lead-sulfide, lead-telluride, cadmium-selenide, and cadmium-sulfide, among others.

Such temperature sensitive materials can be provided in a variety of different manners. For example, the materials can be provided as films, as resins, as powders, or as particles among other forms. These materials can be used independently or in conjunction with other materials. For example, in embodiments utilizing a thin film, a temperature sensitive material resin can be cured (e.g., UV, thermally, and/or chemically) in the form of a thin film or can be coated onto a thin film material. In such embodiments, the temperature sensitive material can be cured, molded, mixed, bonded, or adhered, among other combination processes to one or more other materials which may or may not be temperature sensitive.

In some embodiments of the present disclosure, a transmitter and receiver can be used to send and receive a test pulse via the optical pathway of the optical network. The transmitter and receiver can be those used to send light signals for general communication in the optical network or can be an additional transmitter and/or receiver, provided to send a test pulse, for example a test pulse can be used to detect one or more emission spectra of the test pulse and this information can be used to determine temperature.

Temperature sensitive materials can have additional uses within optical networks. For example, in some embodiments, the temperature sensitive material can act as a thermoelectric cooling component. In some embodiments, the temperature sensitive material can act as a heat sink.

As stated above, the temperature sensitive material can be used to form a portion or all of a connector between optical pathway sections. In some embodiments, the connector can include an outer portion to aid in securing the optical pathway sections together. Such outer portions can be fabricated from plastics, polymers, metals, and other suitable materials.

In various embodiments, the connector can also include an inner portion constructed from a temperature sensitive material. In such embodiments, the inner portion can form an interface between an end of a first optical pathway section and an end of a second optical pathway section.

Further, in some embodiments of the present disclosure, a network or system can include a tunable transmitter that can be tuned based upon changes to the characteristics of the light wave that passes through the temperature sensitive material. This transmitter can be used as the emitter for emitting general communications on the optical network or system, and/or as the emitter for sending test pulses.

In various embodiments of the present disclosure, logic circuitry can be provided that can analyze one or more characteristics of the light wave passing through the connector to determine whether they have changed and/or what adjustments to make to the signal being transmitted. In some embodiments, the logic circuitry can be a processor or state type circuitry, among other logic circuit types. In some embodiments of the present disclosure, a tunable transmitter can be tuned based upon the analysis performed by the logic circuitry.

BRIEF DESCRIPTION OF THE DRAWINGS

FIG. 2D is a table illustrating a transmission of light wave signals based on the embodiment of FIG. 2A.

DETAILED DESCRIPTION

The present disclosure includes a number of device and system embodiments for sensing temperature along the optical pathways of an optical network. Embodiments of the present disclosure will now be described in relation to the accompanying drawings, which will at least assist in illustrating the various features of the various embodiments.

Figure 1A:
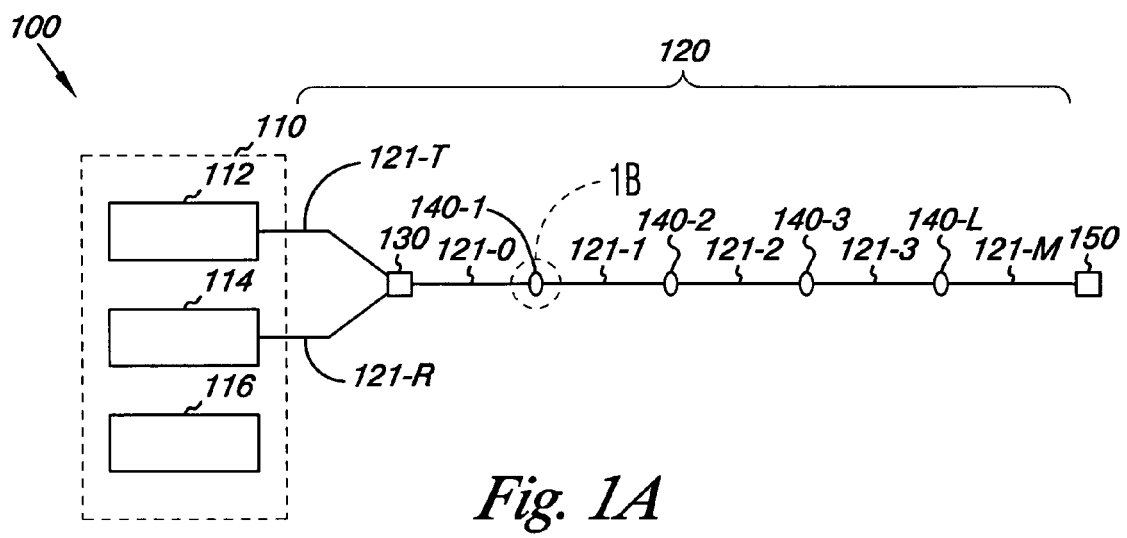
FIG. 1A is an illustration of an optical network embodiment of the present disclosure including a temperature sensing system.

FIG. 1A is an illustration of an optical network embodiment of the present disclosure including a temperature sensing system. In the embodiment illustrated in FIG. 1A, an optical network 100 generally includes a transmission component 110 and an optical pathway 120. In this embodiment, the transmission component 110 includes a transmitter 112, a receiver 114, and logic circuitry 116. The optical network can include a number of various components. For example, in the embodiment of FIG. 1A, the optical network 100 includes a number of optical pathway sections 121-T, 121-0, 121-1, 121-2, 121-3, 121-M, and 121-R, a splitter 130, a number of connectors 140-1, 140-2, 140-3, and 140-L, and a reflector 150.

Although generally termed a transmission component 110, in the embodiment illustrated in FIG. 1A, the transmission component includes separate transmitter and receiver components. In the embodiment illustrated in FIG. 1A, light signals that are transmitted by the transmitter 112, travel down the optical pathway 120. The light waves then reflect off reflector 150, and return to the transmission component 110 where they are received by the receiver 114.

Accordingly, in this embodiment, the transmitter 112 is positioned to transmit light waves into optical pathway section 120-T. The optical pathway section 120-T is positioned to transmit light waves into the splitter 130. The splitter 130 transmits light waves from the transmitter 112 into optical pathway section 121-0.

Optical pathway sections 121-0 and 121-1 are joined together by connector 140-1. The optical pathway sections 121-1 and 121-2 are similarly joined together by connector 140-2. Further, optical pathway sections 121-2 and 121-3 are joined together by connector 140-3. And, optical pathway sections 121-3 and 121-M are joined together by connector 140-L. The light waves pass through the optical pathway sections 121-1 through 121-M and through connectors 140-1 through 140-L.

In the embodiment illustrated in FIG. 1A, a reflector 150 is positioned to reflect light waves from optical pathway section 121-M back into optical pathway section 121-M. A reflector can include a mirror or an end facet of an optical fiber, among other reflective structures. The reflected light waves pass back through the optical pathway sections 121-M through 121-1 and through connectors 140-L through 140-1. The splitter is positioned to direct the light waves into optical pathway 121-R. A receiver 114 is positioned to receive light waves out of optical pathway 121-R.

In some embodiments, logic circuitry 116 can be associated with (e.g., can include or be connected to) transmitter 112 to obtain information from transmitter 112. Logic circuitry 116 can also be associated with the receiver 114 to obtain information from receiver 114.

Transmitter 112 can be used to transmit encoded and/or non-encoded signals in the form of light waves. The transmitter 112 can be associated with logic circuitry to encode information into the signals. Encoding can be accomplished, for example, by modulating frequency, wavelength, and/or intensity of a light signal.

In some embodiments, connectors 140-1, 140-2, 140-3, and 140-L can each include a temperature sensitive material. As stated above, various temperature sensitive materials can have light transmission characteristics that change based upon the temperature of the temperature sensitive material. For example, at one temperature, a temperature sensitive material transmits a particular wavelength of light. At another temperature, the temperature sensitive material absorbs that same particular wavelength of light. In this way, the temperature at the location of the temperature sensitive material can be determined. In some embodiments based upon this temperature information, the light signal can be modified.

Temperature sensitive connectors can be made entirely of temperature sensitive material or can have a portion, such as the portion through which the light signals pass, made from temperature sensitive material. Temperature sensitive connectors can be used in optical networks, such as those illustrated in FIGS. 1A and 2A, in a variety of manners. For example, a single or multiple temperature sensitive connectors can be used to identify temperature fluctuations in a network, identify if one or more specific temperature thresholds are being reached or exceeded, and/or identify if one or more temperature thresholds are being reached or exceeded at a particular location.

Various types of temperature sensitive materials that can be used in the various embodiments of the present disclosure can identify a single wavelength, multiple separate wavelengths, or multiple wavelengths in a range. As such, those of ordinary skill in the art will realize upon reading the present disclosure that the functions that can be accomplished with these temperature sensitive materials can change based upon the material or combination of materials utilized and the logic circuitry employed to interpret the changes in the light waves.

Connectors can be of differing sizes, shapes, styles, or types. For example, the connectors in FIGS. 1A and 1B do not include a housing, while those in FIGS. 2A and 2B include a housing, as will be described in more detail below. Connectors can include thin film materials in some embodiments.

In various embodiments of an optical network 100, the connectors can have a variety of temperature dependent light transmission characteristics. For example, a connector can be designed to transmit a single range or multiple ranges of light wavelengths. Similarly, a connector can be designed to absorb a single range or multiple ranges of light wavelengths. Further, each connector can have temperature dependent light transmission characteristics that are similar to or different from one or more of the other connectors.

As stated above, various types of logic circuitry can be used in the various embodiments of the present disclosure. The logic circuitry can be used to identify changes in a light wave transmitted through an optical pathway based upon reference data stored in memory, measured data from the transmitter and/or receiver components, and/or other such temperature or material information that can be used to determine one or more temperatures and/or the effects of temperatures on the optical network. In the embodiment of FIG. 1A, the logic circuitry 116 is provided within transmission component 100.

Figure 2A:
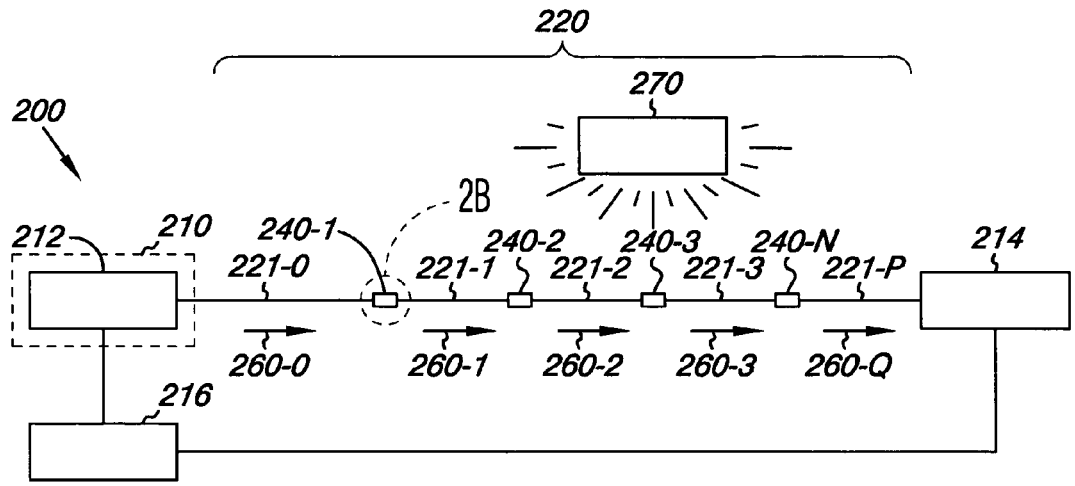
FIG. 2A is an illustration of another optical network embodiment of the present disclosure including a temperature sensing system.

Various embodiments of an optical network can include more or less components than are shown in the embodiments of FIGS. 1A and 2A. For example, embodiments of an optical network can include one or more additional transmitters, optical pathway sections, splitters, connectors, reflectors, receivers, or logic circuitries. Additionally, embodiments of an optical network can include fewer optical pathway sections, connectors, splitters, or reflectors, among other components.

Embodiments of an optical network can also utilize optical pathway sections of many different forms including single-mode fiber-optic cable, multi-mode fiber-optic cable, or plastic-optical cable, among other cable types. Embodiments can also utilize a signal router to provide similar functionality to that of a splitter.

Figure 1B:
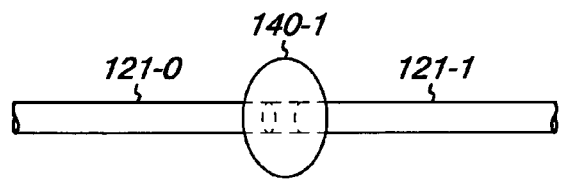
FIG. 1B is a close-up illustration of section 1B illustrated in the embodiment of FIG. 1A.

FIG. 1B is a close-up illustration of section 1B illustrated in the embodiment of FIG. 1A. Optical pathway sections 121-0 and 121-1 are joined together by connector 140-1. In this embodiment, the connector 140-1 does not include a housing and is formed entirely from a temperature sensitive material. Such embodiments can include a coating surrounding the temperature sensitive material. For example, coatings can be used to reduce the effects of ambient temperature or light, among other environmental conditions. In embodiments such as that shown in FIG. 1B, the temperature sensitive connector material can be applied in a malleable state. In some embodiments, the material can be designed to harden. For example, the connector material may be a chemical or thermoset material, among other suitable materials.

FIG. 2A is an illustration of another optical network embodiment of the present disclosure including a temperature sensing system. Similar to the embodiment of FIG. 1A, the embodiment of FIG. 2A includes an optical network 200 having a transmission component 210 and an optical pathway 220. The optical pathway 220 of FIG. 2A includes optical pathway sections 221-0, 221-1, 221-2, 221-3, and 221-P, and connectors 240-1, 240-2, 240-3, and 240-N.

However, in the illustration of FIG. 2A, the transmission component 210 can include either a transmitter or transceiver, as will be described in more detail below, the logic circuitry 216 is connected to this transmission component 210, and the connectors include a housing and are of a different size, shape, style, and type. A temperature source 270 is also provided and discussed with relation to the table provided in FIG. 2D.

With respect to the transmission component 210, in some embodiments the component includes a transmitter 212 and a receiver 214. In some embodiments, transceivers are provided as both components 212 and 214. In such embodiments, a splitter and/or reflector may not be utilized, but rather, a signal is transmitted from transmitter/transceiver 212 and is received by receiver/transceiver 214. Although shown as an end point to the optical network 200, the receiver/transceiver 214 can be positioned in the middle of an optical pathway with a signal passing by or through the receiver/transceiver 214 and continuing through additional sections of optical fiber.

Also, in such embodiments, the logic circuitry 216 can communicate with the transmitter/transceiver 212 and/or the receiver/transceiver 214 to obtain temperature information. Temperature information can be obtained, for example, by accessing the temperature information at the components 212 and/or 214 (e.g., 112 and 114 in FIG. 1A) and/or receiving the information from the components 212 and/or 214 (e.g., 112 and 114 of FIG. 1A).

In various embodiments, logic circuitry, such as circuitry 116 and 216 of FIGS. 1A and 2A respectively, can be located: within one or more of the optical network components, such as those shown in FIGS. 1A and 2A; can be located in a separate component; and/or can be located remotely (i.e., outside the optical network). For example, in FIG. 1A, logic circuitry 116 is located within transmission component 110 and, in FIG. 2A, logic circuitry 216 is provided as an independent component 216 of the optical network.

Figure 2B:
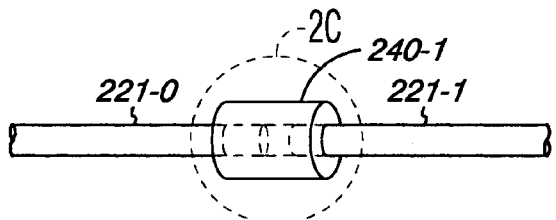
FIG. 2B is a close-up illustration of section 2B illustrated in the embodiment of FIG. 2A.

FIG. 2B is a close-up illustration of section 2B illustrated in the embodiment of FIG. 2A. Optical pathway sections 221-0 and 221-1 are joined together by connector 240-1. The joining of the sections 221-0 and 221-2 can be accomplished in a variety of manners. For example, the sections and connector can be joined by a frictional fit, an adhesive, a bonding agent, or weld, among other mechanical and/or chemical attachment mechanisms.

Figure 2C:
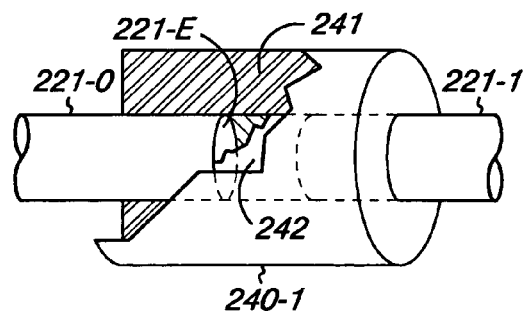
FIG. 2C is a close-up cut-away illustration of section 2C illustrated in the embodiment of FIG. 2B.

FIG. 2C is a close-up cut-away illustration of section 2C illustrated in the embodiment of FIG. 2B. Optical pathway sections 221-0 and 221-1 are joined together by connector 240-1. Optical pathway section 221-0 includes a section endface 221-E. In this embodiment, connector 240-1 includes an outer connector portion 241 (e.g., housing) and inner portion (e.g., optical pathway) 242. The inner connector portion 242 forms an interface allowing light signals to pass between optical pathway sections 221-0 and 221-1.

The outer connector portion 241 can have a variety of shapes and sizes, and can be formed from a variety of materials. For example, suitable materials include: elastomeric materials, including rubbers and polymers; and non-elastomeric materials, including polymers, ceramics, and metals. In some embodiments, a temperature sensitive material can be used as a portion or the entire outer connector portion 241. In such embodiments, the connector 240-1 or the temperature sensitive material of the outer connector portion 241 can be used as a heat sink or thermocooling component. In this way, heat can be removed from the components of an optical network.

Additionally, typically optical fiber is formed with a number of layers, such as an outer layer (e.g., a cladding or a coating) and an inner core (e.g., optical pathway), among others. In various embodiments, these layers can be provided, or emulated, with other materials to provide an optical pathway having dimensions and optical characteristics similar to that of the optical pathway sections. In such embodiments, the optical pathway of the connector 240-1 can be formed with temperature sensitive material and the other portions of the connector can be formed of materials that provide or emulate the characteristics of the materials of the optical fiber sections 221-0 and/or 221-1

FIG. 2D is a table illustrating a transmission of light wave signals based on the embodiment of FIG. 2A. The table shows the presence of wavelengths A, B, C, D, and E at various points along the optical path 220. The table is compiled based upon one or more signals received by the receiver 214. In obtaining the data shown in the table, each of the connectors 240-1, 240-2, 240-3, and 240-N has a different temperature at which a particular wavelength is absorbed. In this example, wavelength A is absorbed by connector 240-1 at a first temperature range, wavelength B is absorbed by connector 240-2 at a second temperature range, wavelength C is absorbed by connector 240-3 at a third temperature range, wavelength D is absorbed by connector 240-4 at a fourth temperature range, and wavelength E is absorbed by connector 240-N at an Nth temperature range. Although ranges are used in this embodiment, materials may absorb based upon temperature thresholds and/or specific temperatures. Further, although this embodiment describes absorption of particular wavelengths by particular connectors, multiple wavelengths and/or wavelength ranges may be absorbed in some embodiments.

In the embodiment described in the table of FIG. 2D, wavelength C was absorbed along its passage through the optical pathway. Based upon the characteristics of the temperature sensitive materials of the connectors described above, wavelength C was absorbed by connector 240-3 and, accordingly, wavelength C was present at points 260-0, 260-1, and 260-2, but not at 260-3 and 260-Q. Accordingly, at the location of connector 240-3, the temperature was within the third temperature range, such that the wavelength was absorbed.

In this, and various other manners described and/or inherently provided by optical networks and temperature sensing systems of the present disclosure, a number of temperatures can be measured within an optical network and at particular locations. The resulting information can indicate that a temperature source, such as source 270, is changing the temperature along the optical pathway. Such results can also indicate that the temperature of the optical network is within a particular range at a particular location.

If multiple connectors having the same characteristics are used, then it can be determined whether the temperature is consistently within this range or changes at a particular location. In some embodiments, this can be accomplished by inserting the particular connector at various locations along the optical pathway.

Based on this information, the type of materials used as connectors can be changed to avoid materials that absorb wavelengths within the detected temperature ranges and/or the wavelengths used can be changed to avoid wavelengths affected by the materials. In such embodiments, a tunable transmission component can be utilized to adjust one or more of the wavelengths utilized. In some embodiments, a tuner component can be used to adjust the transmission component. In such tunable embodiments, logic circuitry can be provided to analyze the temperature information and tune the transmission component accordingly.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the invention includes various other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. An optical network, comprising:
   an optical pathway having a number of pathway sections;
   an optical emitter positioned to emit a light wave through the optical pathway;
   a receiver positioned to receive the light wave via the optical pathway;
   a connector, positioned between a pair of pathway sections of the optical pathway, at least a portion of the connector formed from a temperature sensitive material; and
   wherein one or more characteristics of the light wave passing through the connector change based upon the temperature sensitive material's temperature.

2. The network of claim 1, wherein a transmitter and a receiver are used to send a test pulse through the optical pathway.

3. The network of claim 1, wherein a transmitter and a receiver are used to send a test pulse through the optical pathway to detect emission spectra of the test pulse.

4. The network of claim 1, wherein the temperature sensitive material acts as a thermoelectric cooling component.

5. The network of claim 1, wherein the temperature sensitive material is a quantum dot thin film material.

6. The network of claim 1, wherein the temperature sensitive material is selected from the group including:
   lead-selenide;
   lead-sulfide;
   lead-telluride;
   cadmium-selenide; and
   cadmium-sulfide.

7. The network of claim 1, wherein the temperature sensitive material acts as a heat sink.

8. A transmitting and receiving system, comprising:
   an optical pathway having a number of pathway sections;
   an optical transmitter positioned to transmit a light wave through the optical pathway;
   a receiver positioned to receive the light wave via the optical pathway; and
   means for connecting two optical pathway sections, positioned between a pair of adjacent pathway sections of the optical pathway, wherein the means for connecting includes a temperature sensitive material positioned to pass the light wave therethrough and wherein one or more characteristics of the light wave passing through the temperature sensitive material change based upon the temperature sensitive material's temperature.

9. The system of claim 8, wherein the means for connecting is a connector having at least a portion of the connector constructed from a temperature sensitive material.

10. The system of claim 8, wherein the means for connecting includes a polymer outer connector and an inner portion constructed from a temperature sensitive material.

11. The system of claim 10, wherein the inner portion forms an interface between an end of a first optical pathway section and an end of a second optical pathway section.

12. The system of claim 8, wherein the means for connecting includes at least a portion constructed from a quantum dot thin film material.

13. The system of claim 8, wherein the transmitter is a tunable transmitter that can be tuned based upon the one or more characteristics of the light wave passing through the connector that have changed.

14. The system of claim 13, wherein the system includes a tunable transceiver that can be tuned based upon the one or more characteristics of the light wave passing through the connector that have changed.

15. The system of claim 8, including logic circuitry that can analyze the one or more characteristics of the light wave passing through the connector that have changed.

16. The system of claim 15, including a tunable transmitter that can be tuned based upon the analysis performed by the logic circuitry.

17. The system of claim 15, wherein the logic circuitry is a processor.

* * * * *